United States Patent [19]

Reynolds

[11] 4,251,245
[45] Feb. 17, 1981

[54] SIDE LOADING FILTER APPARATUS
[75] Inventor: Kenneth E. Reynolds, Gibsonia, Pa.
[73] Assignee: Mine Safety Appliances Company, Pittsburgh, Pa.
[21] Appl. No.: 103,081
[22] Filed: Dec. 12, 1979
[51] Int. Cl.³ ............................................. B01D 46/00
[52] U.S. Cl. ........................................ 55/481; 55/484; 55/DIG. 9
[58] Field of Search ................. 55/422, 481, 478, 480, 55/484, 502, DIG. 9

[56] References Cited

U.S. PATENT DOCUMENTS

| | | | |
|---|---|---|---|
| 2,804,165 | 8/1957 | Blomgren et al. | 55/481 X |
| 3,423,908 | 1/1969 | Hart | 55/481 |
| 3,630,008 | 12/1971 | Revell | 55/502 X |
| 4,124,361 | 11/1978 | Revell | 55/484 X |
| 4,198,221 | 4/1980 | Catlin et al. | 55/481 |

Primary Examiner—Kathleen J. Prunner
Attorney, Agent, or Firm—Brown, Flick & Peckham

[57] ABSTRACT

A filter chamber provided with a side wall having a row of uniformly spaced openings therethrough also has an end wall provided with an access door from which a track extends along the side wall below the openings. Filter units are insertable through the door for placement on the track. A rod extending lengthwise of the track and having an outer end accessible through the door is supported for axial movement back and forth parallel to the track between inner and outer positions. At longitudinally spaced intervals greater than the width of a filter unit lugs project from the rod, all in the same direction. There are as many lugs as the wall openings. The rod is rotatable to turn the lugs from positions in which they will overlap one side of filter units on the track to positions that permit the lugs to be moved to the opposite side of the filter units. The lugs are located on the rod in positions for moving filter units step by step along the track from alignment of each with one of the wall openings to alignment with another opening when the rod is moved back and forth, whereby to load or unload the filter chamber.

5 Claims, 7 Drawing Figures

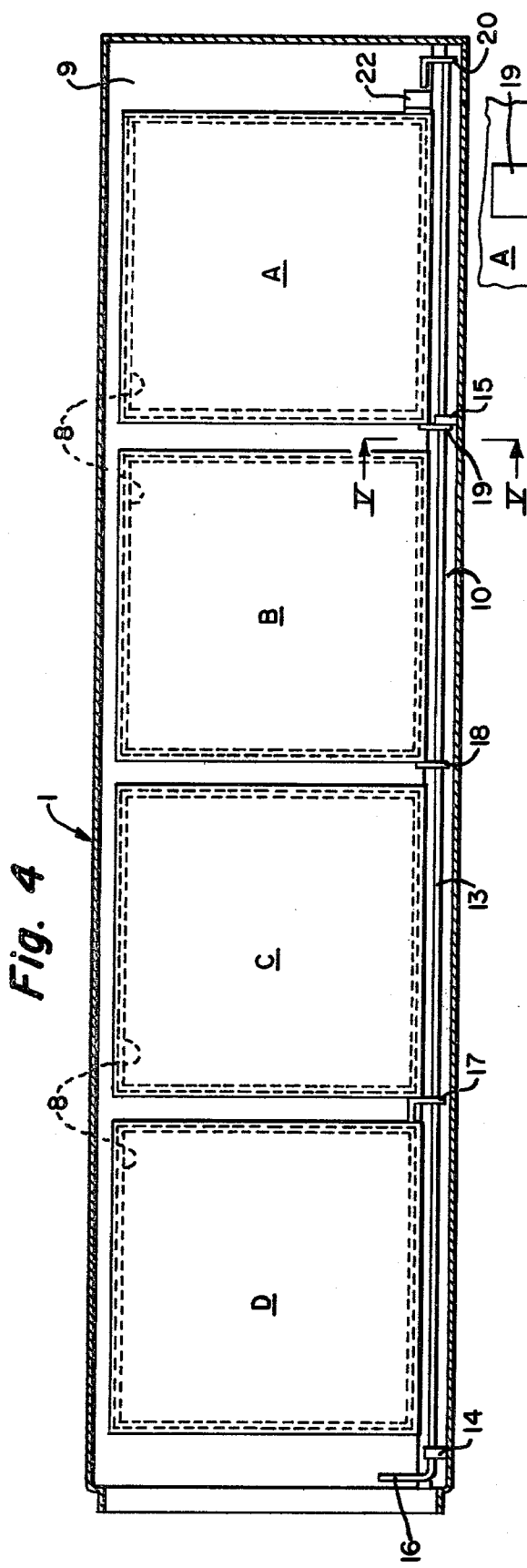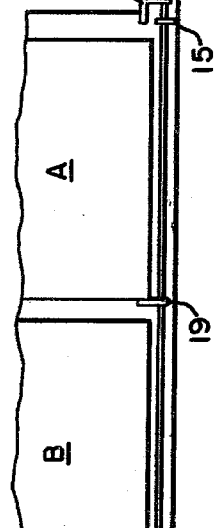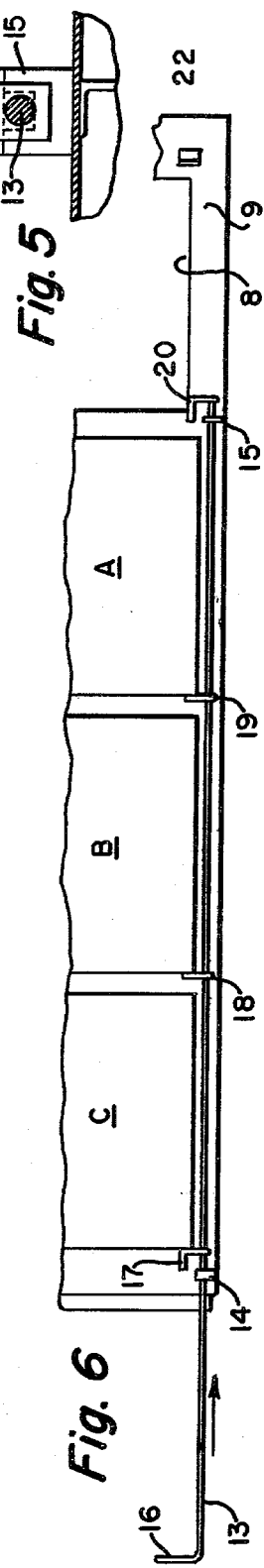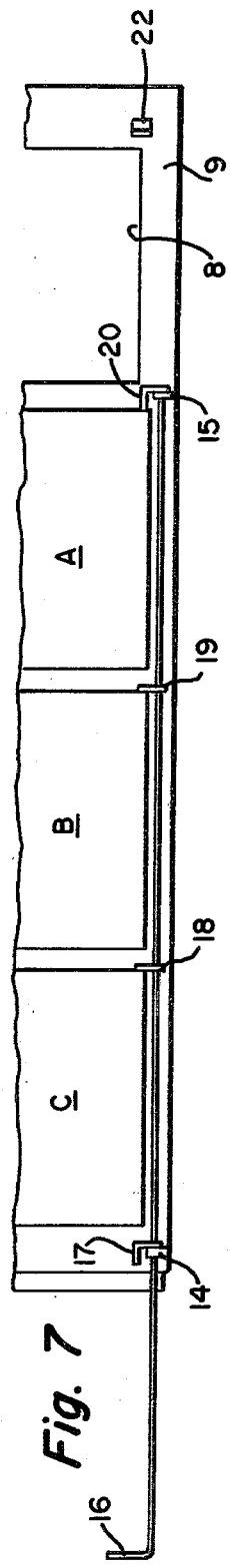

SIDE LOADING FILTER APPARATUS

It is a simple matter to place a filter unit in a filter chamber or to remove it when the chamber accommodates only one unit, but when the chamber is designed to receive two or more filter units and a person cannot reach into the chamber far enough to position them properly, a problem arises. The problem is increased when the gas being filtered is radioactive and the loading and unloading must be done through a bag sealed around the chamber door, such as disclosed in U.S. Pat. No. 3,354,616.

OBJECTS OF THE INVENTION

It is among the objects of this invention to provide a side loading filter chamber with inexpensive manually operable means for aligning filter units with a plurality of laterally spaced wall openings and for removing the units from the chamber.

BRIEF DESCRIPTION OF THE DRAWINGS

The preferred embodiment of the invention is illustrated in the accompanying drawings, in which
FIG. 4 is an enlarged longitudinal section of the filter chamber showing four filter units just moved into final position;
FIG. 5 is an enlarged fragmentary vertical section taken on the line V—V of FIG. 4;
FIG. 6 is a somewhat diagrammatic view showing three of the filter units about to be pushed into final position;
and
FIG. 7 is a similar view, but showing the three filter units moved one step toward the door of the filter chamber during retrieval of used filters.

DESCRIPTION OF THE INVENTION

Figure 1:
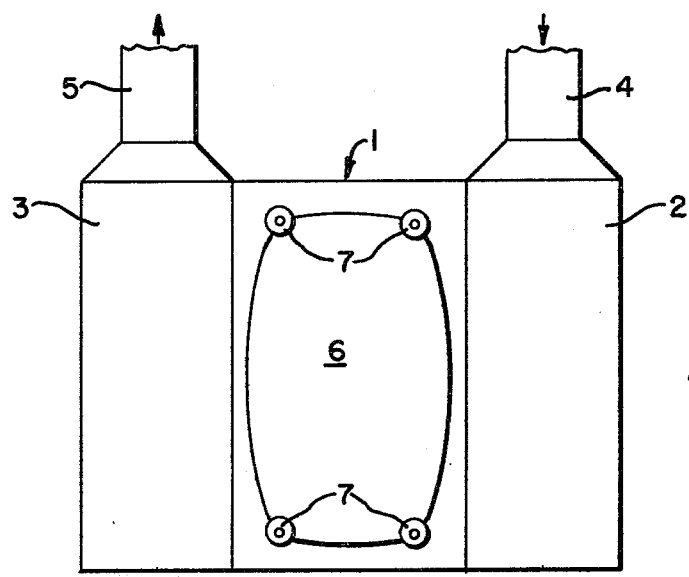
FIG. 1 is an end view.
Figure 2:
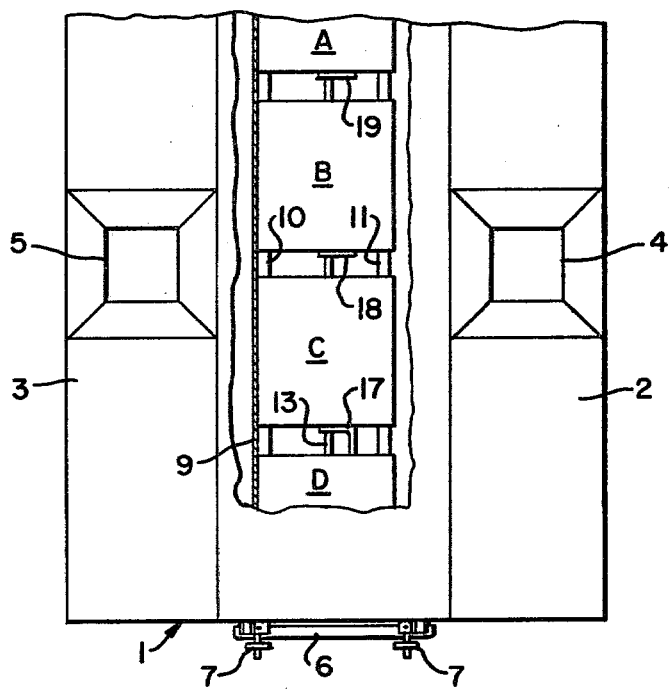
FIG. 2 is a fragmentary plan view with the top partly broken away to show the inside of the filter chamber.
Figure 3:
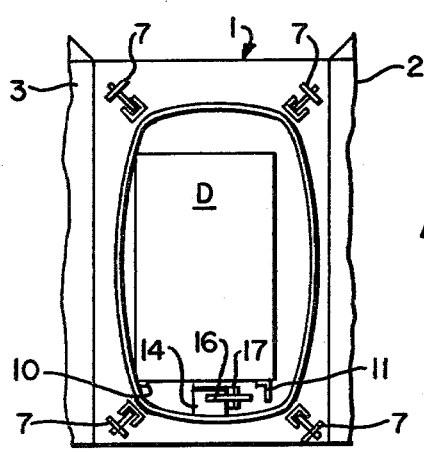
FIG. 3 is a fragmentary end view showing the door removed from the filter chamber.

Referring to FIGS. 1 to 3 of the drawings, an elongated filter housing or chamber 1 is formed between an inlet housing 2 and an outlet housing 3. A wall of the inlet housing, such as the top wall, is provided with an inlet opening connected by a conduit 4 to a source of gas, such as air, to be filtered that will flow into the housing and then into the filter chamber through one or more openings in the common side wall between the housing and the filter chamber. The air will flow across the chamber and out through two or more openings in its opposite side wall and into the outlet housing. A conduit 5 connected to an outlet opening in this housing conducts the filtered air away. As the air passes through the filter chamber it flows through rectangular filter units held tightly against the side wall around the rectangular openings therein by means of conventional clamping bars (not shown). Four filter units A, B, C and D are shown. At one end of the filter chamber there is an access opening that normally is sealed by a door 6 that may be held in place by toggle bolts 7 or the like. It is through this doorway that filter units are placed in and removed from the filter chamber.

Inside the filter chamber the filter units are supported on, and are movable along, a track that extends from the door toward the opposite end of the chamber below the four outlet openings 8 in its side wall 9. See FIGS. 2, 3 and 4. The track preferably consists of a pair of laterally spaced rails 10 and 11 as shown in FIGS. 2 and 3, but rail 11 is omitted from FIG. 4 for the sake of clearness. The filter units, resting on the rails in front of the wall openings, are pressed tightly against the side wall in conventional manner as previously mentioned.

It is a feature of this invention that a number of filters can be moved sideways along the track and aligned with a corresponding number of openings in side wall 9 without a person having to enter the filter chamber or even reach into it very far. Accordingly, as best shown in FIG. 4, a rod 13 extends lengthwise of the track, preferably between the rails 10 and 11. The rod is supported in a pair of rigidly mounted bearings 14 and 15 that allow it to be moved lengthwise back and forth and also rotated on its axis. For this manipulation the rod is provided with a handle 16 by bending its outer end portion at an angle to the rest of the rod. When the rod is in its innermost or rear position, the handle is located just inside the door, through which the rod can be pulled a limited distance.

Rigidly mounted on the rod are several lugs, all of which project in the same direction from the rod as shown in FIGS. 4, 6 and 7. There are as many lugs as there are openings 8 in the side wall of the chamber. Since the drawings show four openings for four filter units, there are four lugs 17, 18, 19 and 20 on the rod. The lugs are spaced from one another a distance greater than the width of a filter unit. When the rod is in its inner position, as shown in FIG. 4, the outermost lug 17 is located between the first two openings 8 next to the chamber door. The innermost lug 20 is always located between bearing 15 and the inner end of the filter chamber. When the rod is pulled out to its outer position, as shown in FIG. 7, outer lug 17 is located between bearing 14 and the first wall opening.

Ordinarily, handle 16 is turned on its side in the filter chamber as shown in FIG. 3 so that the lugs will project laterally from the rod, but in order to move the filter units along the track in either direction the rod must be turned to extend the lugs upwardly so that they can engage the sides of the filter units as shown in FIGS. 4 to 7.

Referring to FIG. 4, in which the four filters are aligned with the four openings in side wall 9, it will be seen that the spacing of the lugs along the rod is such that lugs 17, 18 and 19 engage the sides of filter units C, B and A, respectively, facing the chamber door. Lug 20 is spaced a predetermined distance behind filter A. Lug 19 engages bearing 15, which serves as a stop. A further stop may be provided in the form of a bracket 22 secured to side wall 9 in a position to be engaged by filter A when that filter has reached its proper position.

LOADING OPERATION

The procedure for loading the empty filter chamber with filters is to insert filter unit A through the open door and place it on the track just inside the chamber. With handle 16 extending laterally so that lug 17 can be pulled across the bottom of the filter, the rod is pulled out until lugs 17 and 20 engage the rod bearings. Then the handle is swung up to swing lug 17 up beside filter A. The rod then is pushed inwardly as far as it will go, which will cause lug 17 to slide the filter along the track to a position in alignment with the second opening 8. The rod then is turned to disengage the lug from the filter, filter unit B is placed on the track just inside the door, and the rod is pulled out so that lugs 17 and 18 can be swung up beside units B and A, respectively. The rod is pushed in again, which causes lug 18 to push filter A into alignment with the third opening 8 and simultaneously causes lug 17 to push filter B into alignment with the second opening. Filter unit C then is placed on the track, the rod is turned and pulled out and then is turned back so that lug 17 can engage the side of filter C, lug 18 can engage filter B, and lug 19 can engage filter A. This condition is illustrated in FIG. 6, where the rod is ready to be pushed in, in order to align the three filters with the second, third and fourth openings, whereupon they will be in the positions shown in FIG. 4. It then only remains for filter unit D to be placed on the track and moved in against the upright lug 17, the upper portion of which extends outwardly along the rod just far enough to assure filter D being in alignment with the front opening when that filter is in engagement with the lug, as shown. By following the step by step procedure just described, all four filter units are quickly and easily aligned with the four openings in side wall 9.

UNLOADING OPERATION

To remove spent filter units from the filter chamber, the loading procedure just explained is reversed. Thus, filter D is pulled out through the open door and set aside. Then the rod is turned to permit lugs 18, 19 and 20 to engage the back sides of the three remaining filters. When the rod is pulled out from the chamber, those three lugs will slide the three filters one space toward the door as shown in FIG. 7. The upper part of lug 20 extends outwardly along the rod far enough so that when the lug engages bearing 15, filter A will be moved far enough away from the bearing to permit lug 19 to be swung up behind it after the rod has been pushed in to the position shown in FIG. 4. Upon pulling the rod out again after filter C has been removed from the chamber, lug 19 will move filter A to the second opening from the door and lug 18 will move filter B to the first opening, from which it can be lifted out of the filter chamber. The next time the rod is moved in and out, lug 18 will move filter A to the door, where it can be removed from the chamber.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In combination, a filter chamber provided with a side wall having a row of uniformly spaced openings therethrough, said chamber also having an end wall provided with an access door at the outer end of said row, a track extending from said door along said side wall at the bottom of said openings, filter units insertable through said door and adapted to be mounted on said track, a rod extending lengthwise of the track and having an outer end accessible through the door, means supporting the rod for axial movement by manual manipulation back and forth parallel to said track between inner and outer positions, and a plurality of lugs rigidly mounted on the rod at longitudinally spaced intervals and all projecting in the same direction from the rod, there being as many lugs as said openings with the lugs spaced apart a distance greater than the width of a filter unit, the rod being rotatable to turn said lugs from positions for overlapping engagement with one side of filter units on the track to positions for permitting the lugs to be moved to the opposite side of the filter units, the lugs being located on the rod in positions for moving filter units step by step along the track from alignment with one of said openings to alignment with another opening when the rod is moved back and forth, the outermost lug being located between said door and the outermost of said openings when the rod is in its outer position, whereby to push a filter unit placed on said track beside said outermost opening into a position in alignment with the next opening when the rod is moved to its inner position, and the innermost lug being located between the innermost opening and the inner end of said side wall when the rod is in its inner position.

2. In the combination according to claim 1, said outermost lug extending lengthwise of said rod far enough to align the last inserted filter unit with said outermost opening when the rod is in its inner position.

3. In the combination according to claim 1, said rod-supporting means including a support for said rod located between the inner end of said side wall and the inner position of the lug next to the innermost lug, the innermost lug having a portion extending far enough across said rod support when that lug engages the support to move the innermost filter unit to a position outwardly of said inner position of said next lug.

4. In the combination according to claim 1, said track including a pair of laterally spaced rails beneath the filter units, and said rod being disposed between said rails.

5. In the combination according to claim 1, said track including a pair of laterally spaced rails beneath the filter units, said rod being disposed between said rails, said outermost lug extending lengthwise of said rod far enough to align the last inserted filter unit with said outermost opening when the rod is in its inner position with said outermost lug extending upwardly between two filter units, said rod-supporting means including a support for said rod located between the inner end of said track and the inner position of the lug next to the innermost lug, and the innermost lug having a portion extending far enough across said rod support when that lug extends upwardly in engagement with the support to move the innermost filter unit to a position spaced outwardly from said inner position of said next lug.

* * * * *